UNITED STATES PATENT OFFICE.

ALBERT REDLICH AND JULIUS WLADIKA, OF VIENNA, AUSTRIA-HUNGARY.

TREATMENT OF QUEBRACHO EXTRACT.

939,742. Specification of Letters Patent. Patented Nov. 9, 1909.

No Drawing. Application filed June 30, 1909. Serial No. 505,234.

*To all whom it may concern:*

Be it known that we, ALBERT REDLICH and JULIUS WLADIKA, subjects of the Emperor of Austria-Hungary, both residing at Vienna, Austria - Hungary, have invented certain new and useful Improvements in the Treatment of Quebracho Extracts, of which the following is a specification.

Methods of clarifying quebracho - extract and of making it easily soluble in the cold are already known, in which the mud deposited when the tanning liquor cools is dissolved by the addition of water and small proportions of alkali, the solution or a part thereof being then added to liquor from which the mud has or has not been separated, whereby foreign matter, including a part of the difficultly soluble tanning substances, is precipitated in flocculent form. For making soluble the difficultly soluble tanning substances contained in this precipitate, tanning extracts or liquors of high acidity or a quantity of acid equivalent to the alkali used are added to the solution of the mud in alkali and water. Both for the purpose of clarifying the liquor and for transforming the insoluble tanning substances contained in the mud into soluble form, the mud must be brought into solution by the addition of water and alkali. This has the disadvantage that the final solutions are very dilute and require much steam for boiling them down.

The present invention relates to a process which has not this disadvantage and by which the necessary manipulations are simplified, the dissolving of the mud being omitted.

The process is carried out as follows: The hot liquor obtained by diffusion from the quebracho wood is mixed, immediately after it has been obtained, with an alkali, such as for example soda or potash or the like, in sufficient proportion to transform the insoluble tanning substances contained in the liquor into soluble tannates. The necessary proportion of the alkali to be added is ascertained empirically by allowing a small quantity of the liquor to cool and then ascertaining how much alkali must be added to dissolve the mud which has settled. Generally about 1 gram of anhydrous sodium carbonate is sufficient for 100 grams of mud. After this addition the liquor is heated with exclusion of air for about two hours whereby the insoluble tanning substances are actually dissolved without imparting to the liquor a darker color or without impairing the tanning strength of the liquor which always occur if alkaline tanning liquors come into contact with the air or are heated with access of air. After the heating operation, there is added to the liquor a quantity of a suitable acid such as hydrochloric acid or sulfuric acid equivalent to the alkali used and this addition of acid produces a splitting of the tannates to form soluble tanning substances. The mass is then left to cool, whereupon the resinous materials separate while the whole of the tanning material remains in solution. The clear, light colored liquor is then drawn off from the precipitate, which contains no tanning substances and is boiled down in the usual manner, an extract being obtained which is easily and clearly soluble in cold water. It has also been ascertained that the solution of the difficultly soluble tanning substances is hastened if the heating of the quebracho liquor with alkali is conducted under pressure.

The steps of the process in the present application are the reverse of those in the process mentioned in the introduction to this specification. The tanning materials insoluble in cold water are first made soluble and the foreign matters are then precipitated.

Claims—

1. The process for treating quebracho extracts which consists in mixing the hot liquor obtained by diffusion from the quebracho wood with an alkali, heating the mixture directly with exclusion of air, adding a quantity of acid equivalent to the quantity of alkali used, cooling the resultant mixture, to precipitate the resinous matter, and drawing off the clear liquor.

2. The process for treating quebracho extracts which consists in mixing the hot liquor obtained by diffusion from the quebracho wood with an alkali, heating the mixture under pressure and with exclusion of air, adding a quantity of acid equivalent to the quantity of alkali used, cooling the resultant mixture, to precipitate the resinous matter, and drawing off the clear liquor.

In testimony whereof we have hereunto set our hands in presence of two subscribing witnesses.

ALBERT REDLICH.
JULIUS WLADIKA.

Witnesses:
JOSEF RUBASCH,
ROBERT W. HEINGARTNER.